DYNAMIC PINCUSHION CORRECTION WITH ONE TRANSDUCTOR
Filed Sept. 27, 1965
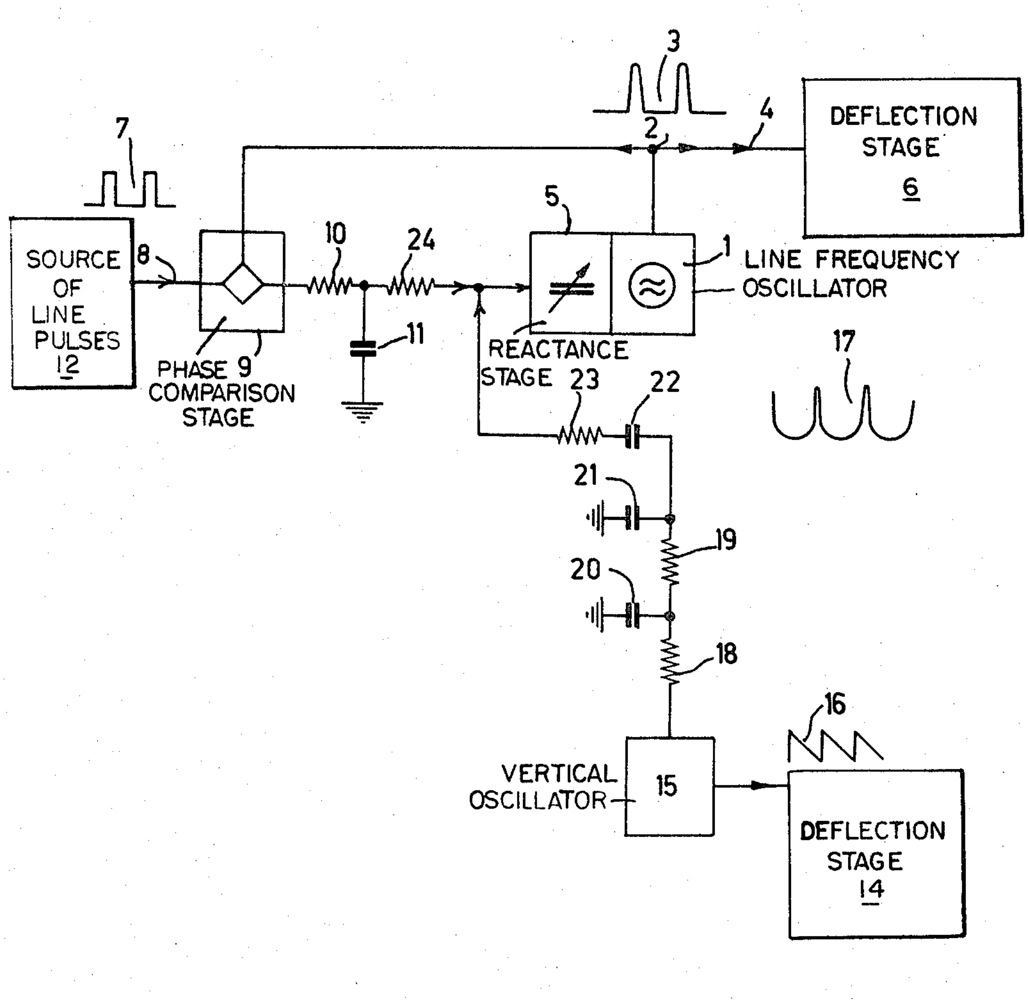
INVENTOR.
JÖRG WÖLBER
BY
Frank R. Trifari
AGENT United States Patent Office 3,430,097

Patented Feb. 25, 1969

3,430,097

DYNAMIC PINCUSHION CORRECTION WITH ONE TRANSDUCTOR

Jörg Wölber, Hamburg, Germany, assignor to North American Philips Company, Inc., New York, N.Y., a corporation of Delaware Filed Sept. 27, 1965, Ser. No. 490,607
Claims priority, application Germany, Sept. 26, 1964, P 35,153
U.S. Cl. 315—24 6 Claims
Int. Cl. H01j 29/70

ABSTRACT OF THE DISCLOSURE

A system for correcting for arc shaped distortion in the raster of a display screen, for example in a television system, in which a parabolic voltage at the vertical deflection frequency is employed to modulate the phase of the line frequency deflection oscillator.

The invention relates to a circuit arrangement for correcting an image consisting of periodically written lines, comprising a line output stage, the output circuit of which includes the line output transformer and means for correcting a cushion-shaped distortion of the image.

It is known that in display tubes in which the radius of curvature of the image plane determined by the deflecting coils is smaller than the radius of curvature of the display screen (which screen is substantially flat and thus has a substantially infinite radius of curvature), a cushion-shaped distortion of the raster written on the screen occurs. By additional correction arrangements, for example so-called transducer arrangements as described in copending United States application Ser. No. 505,540, filed Oct. 28, 1965 this cushion-shaped distortion is obviated. However, it appears that reproducing errors are involved which produce a shift which is substantially constant mainly in one direction throughout the horizontal deflection, but which varies with the vertical deflection, so that an arc-shaped distortion of the image is produced.

In a circuit arrangement of the above described type such arc-shaped distortion can be compensated in accordance with the invention by varying the frequency or the phase of the line deflection in accordance with a correction A.C. voltage that varies parabolically with the frequency of the vertical deflection.

The invention will now be described hereinafter more fully by way of example with reference to the drawing, the upper part of which shows a conventional synchronizing arrangement of a television receiver.

An oscillator 1 produces oscillations of line frequency, which are converted into pulses 3 at the oscillator output 2, and these pulses are applied through a conductor 4 to the deflection stage 6. The frequency of the oscillator 1 may be adjusted by a control-voltage by means of a reactance stage 5.

The line pulses 7 of an incoming television image from a source 12 are applied through a conductor 8 to the phase comparison stage 9, and the pulses derived from the oscillator output 2 are also applied to the phase comparison stage. At the output of the phase comparison stage 9 a voltage appears which corresponds to the phase difference between the pulses 3 and 7. This voltage is applied through a smoothing member having a series resistor 10 and a shunt capacitor 11 to the reactance stage 5, for controlling the frequency of the oscillator 1. In the synchronisation state a D.C. control-voltage holds the frequency of the oscillator 1 so that it corresponds to the frequency of the pulses 7.

In accordance with the invention, in order to compensate for an image distortion, which is constant throughout the length of the lines but which varies with the height, the oscillator voltage is varied in dependence upon an A.C. correction voltage varying with the frequency of the vertical deflection. For this purpose the vertical oscillator 15, which supplies a sawtooth current 16 to the associated deflection stage 14, furnishes a substantially parabolically varying correction voltage 17. This voltage may be obtained from the sawtooth voltage of the generator 15 by integration by means of the series resistors 18 and 19 of, for example, 100 and 1000 ohms respectively and the shunt capacitors 20 and 21 of, for example, 100 $\mu$f. each. The parabolic voltage 17 is then applied through a separation capacitor 22 of, for example, 0.12 $\mu$f. and a decoupling resistor 23 of, for example, 180K ohms to the input of the reactance stage 5, for example to the grid of a reactance tube circuit. In order to prevent the correction magnitude from being affected by the smoothing capacitor 11, a further decoupling resistor 24 of, for example, 56K ohms, is provided between the capacitor 11 and the input of stage 5. As an alternative, the smoothing capacitor 11 may be used, instead of the capacitor 21, for the integration of the parabolic voltage, so that the elements 21, 23 and 24 may be omitted.

The parabolic voltage 17 at the input of the reactance stage 5 periodically affects the oscillations of the oscillator. Owing to the frequency-control through the discriminator stage 9, the frequency of the oscillator remains substantially in synchronism with the sychronizing pulses 7. Since the compensation of the disturbance of the natural frequencies due to the correction magnitude 17 requires an opposite variation of the control-voltage supplied by the discriminator 9, the oscillations of the oscillator 1 have to vary so that a corresponding phase variation with respect to the synchronizing pulses 7 occurs. This phase variation produces the desired line shift depending upon the correction voltage 17. A parabolic correction voltage is particularly important when the arrangement comprises furthermore means for compensating a symmetric cushion- or barrel-shaped distortion, for example, due to a transducer circuit between the two deflection circuits. Such a correction arrangement conveying only A.C. magnitudes is usually capable of compensating only symmetric distortions. By using the invention as asymmetric correction is also possible.

It will be obvious that it is possible to carry other corrections substantially constant throughout the line by correspondingly shaped correction magnitude instead of the parabolic voltage 17.

What is claimed is:

1. In a display system of the type having a first oscillator means for generating oscillations of line frequency for application to a line deflection stage, a second oscillator means for producing oscillations of a vertical deflection frequency for application to a vertical deflection stage, and frequency control means connected to control the frequency of said first oscillator means, the improvement comprising raster distortion correction means, said correction means comprising means connected to said second oscillator means for producing a control voltage that varies periodically at said vertical deflection frequency, and means applying said control voltage to said frequency control means for periodically varying the phase of said line frequency oscillations at said vertical deflection frequency.

2. The display system of claim 1 wherein said means for producing a control voltage comprises integrating circuit means, whereby said control voltage has a parabolic waveform.

3. In a display system of the type having a first oscillator means for generating oscillations of line frequency for application to a line deflection stage, a second oscillator means for producing oscillations of a vertical deflection frequency for application to a vertical deflection stage, frequency control means connected to control the frequency of said first oscillator means, a source of line synchronizing pulses, a comparator circuit connected to said source and said first oscillator means for producing a direct first control voltage corresponding to phase differences between said line synchronizing pulses and the output of said first oscillator means, and means applying said first control voltage to said frequency control means for synchronizing said output of said first oscillator means with said line synchronizing pulses; the improvement comprising raster distortion correction means, said correction means comprising means connected to said second oscillator means for producing a control voltage that varies periodically at said vertical deflection frequency, and means applying said control voltage to said frequency control means for periodically varying the phase of said line frequency oscillations at said vertical deflection frequency.

4. The display system of claim 3 wherein said means for producing a control voltage comprises integrating circuit means, whereby said control voltage has a parabolic waveform.

5. The system of claim 3 comprising a line output stage connected to the output of said first oscillator means, said line output stage being of the type which includes means for correcting for cushion-shaped distortion of said raster.

6. A system for correcting arc shaped distortion in the raster of a television display device, said system comprising first and second oscillator means for generating oscillations of line and vertical deflection frequency respectively, a source of line synchronizing signals, comparing circuit means connected to said source and said first oscillator means for producing a direct control voltage which corresponds to the phase difference between the output of said first oscillator means and said line synchronizing pulses, integrating circuit means connected to said second oscillator means for producing a correction voltage having a periodic parabolic waveform with a frequency equal to said vertical deflection frequency, frequency control means connected to said oscillator for controlling the frequency of said first oscillator means, and means applying said direct control voltage and correction voltage to said frequency control means whereby the phase of the output of said first oscillator means varies as a function of the instantaneous amplitude of said connection voltage.

References Cited

UNITED STATES PATENTS

| | | | |
|---|---|---|---|
| 2,758,248 | 8/1956 | Garrett | 315—27 |
| 2,906,919 | 9/1959 | Thor | 315—27 |

RODNEY D. BENNETT, *Primary Examiner.*

J. G. BAXTER, *Assistant Examiner.*

U.S. Cl. X.R.

315—27